(12) United States Patent
Graf et al.

(10) Patent No.: US 10,044,194 B2
(45) Date of Patent: Aug. 7, 2018

(54) DECENTRALIZED ENERGY MANAGEMENT IN AUTOMATED INDUSTRIAL INSTALLATIONS USING SELF-ORGANIZING NETWORKS

(75) Inventors: Rene Graf, Nürnberg (DE); Frank Konopka, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 670 days.

(21) Appl. No.: 14/239,466

(22) PCT Filed: Aug. 17, 2011

(86) PCT No.: PCT/EP2011/064158
§ 371 (c)(1),
(2), (4) Date: Feb. 18, 2014

(87) PCT Pub. No.: WO2013/023692
PCT Pub. Date: Feb. 21, 2013

(65) Prior Publication Data
US 2014/0180492 A1    Jun. 26, 2014

(51) Int. Cl.
*H02J 4/00* (2006.01)
*G05B 19/418* (2006.01)
*H02J 3/14* (2006.01)

(52) U.S. Cl.
CPC .......... *H02J 4/00* (2013.01); *G05B 19/41865* (2013.01); *H02J 3/14* (2013.01); *G05B 2219/32021* (2013.01); *Y02B 70/3225* (2013.01); *Y02P 70/161* (2015.11); *Y02P 80/114* (2015.11); *Y02P 90/20* (2015.11); *Y02P 90/205* (2015.11); *Y04S 20/222* (2013.01)

(58) Field of Classification Search
None
See application file for complete search history.

(56) References Cited

U.S. PATENT DOCUMENTS 3,985,222 A * 10/1976 Kressly .................. B65G 23/30
198/547
4,236,604 A * 12/1980 Warner ..................... A47F 9/04
186/61
(Continued)

FOREIGN PATENT DOCUMENTS

CN        1663192        8/2005
CN        101938146      1/2011
(Continued)

OTHER PUBLICATIONS

'Real-Time Ethernet IP—ProfiNet Technology' Advantech (2011).*
(Continued)

*Primary Examiner* — Mohammad Ali
*Assistant Examiner* — Bernard G Lindsay
(74) *Attorney, Agent, or Firm* — Cozen O'Connor (57) ABSTRACT

Method for anticipatory regulation of energy flows in an electrical supply grid of an automation installation, which includes a number of connecting devices that are connected to the electrical supply grid, wherein the connecting devices exchange information with respect to their energy requirements or their energy supply among one another and the connecting devices exchange energy among one another based on the information.

12 Claims, 2 Drawing Sheets

(56) References Cited

U.S. PATENT DOCUMENTS

| | | | | |
|---|---|---|---|---|
| 5,261,025 A | * | 11/1993 | Post | B60L 7/12 |
| | | | | 327/530 |
| 2003/0009265 A1 | * | 1/2003 | Edwin | G06Q 10/06 |
| | | | | 700/295 |
| 2005/0228509 A1 | * | 10/2005 | James | H04L 12/4625 |
| | | | | 700/19 |
| 2007/0052242 A1 | * | 3/2007 | Mascarin | F03G 7/08 |
| | | | | 290/1 R |
| 2008/0272934 A1 | * | 11/2008 | Wang | H02J 3/14 |
| | | | | 340/870.11 |
| 2012/0124401 A1 | * | 5/2012 | Bosen | H02J 3/14 |
| | | | | 713/310 |

FOREIGN PATENT DOCUMENTS

| | | |
|---|---|---|
| EP | 1263108 A1 | 12/2002 |
| EP | 1717923 A1 | 11/2006 |
| WO | WO 2004/004222 | 1/2004 |
| WO | WO 2007065135 A2 | 6/2007 |
| WO | WO 2010081165 A2 | 7/2010 |
| WO | WO 2011006830 A2 | 1/2011 |

OTHER PUBLICATIONS

'A PROFINET IO application implemented on Wireless LAN', Santandrea, Siemens (2006).*

Devendra et al. 'Coordinated Robots in a Flexible Manufacturing Work Cell' Proceeding of IEEE/ASME International Conference on Advanced Intelligent Mechatronics, IEEE (2001).*

Office Action dated Sep. 23, 2016 which issued in the corresponding Chinese Patent Application No. 201180072875.7.

* cited by examiner

DECENTRALIZED ENERGY MANAGEMENT IN AUTOMATED INDUSTRIAL INSTALLATIONS USING SELF-ORGANIZING NETWORKS

REFERENCE TO RELATED APPLICATION

This is a U.S. national stage of application No. PCT/EP2011/064158 filed 17 Aug. 2011.

BACKGROUND OF THE INVENTION

1. Field of the Invention

The invention relates to a method for proactive regulation of energy flows in an electrical supply network of an automation installation with a number of connecting devices that are each connected to the electrical supply network. The invention also relates to an energy regulation system for the proactive regulation of the energy flows in the electrical supply network of the automation installation of this type and to a corresponding automation installation.

2. Description of the Related Art

Energy management or energy controlling is normally understood to mean the energy engineering planning of a system, on the one hand, and the regulation of the energy flows in the system during operation, on the other hand. Emphasis is placed in particular on the guarantee of security of supply, adherence to the value specifications for specified characteristic parameters and the consideration of economic factors and environmental concerns. These basic requirements or fundamental target specifications are always the same, irrespective of whether the system is a CD player, a heating installation, a family home or a large automation installation, i.e., for example, an industrial production plant.

In the case of an automation installation in which a plurality of subsystems or connecting devices are connected to a common electrical supply network, it must, for example, be ensured that all subsystems are supplied at all times during operation with sufficient electrical energy to cover their energy requirement and accordingly to guarantee security of supply. In addition, in the case of an electrical energy supply, voltage and current strength values are specified as characteristic parameters which, in order to guarantee the functional reliability of the automation installation and its subsystems, may be exceeded or understepped within certain limits only. Furthermore, it is desirable from both an economic and an ecological perspective that the energy requirement of the automation installation is minimized depending on a specified mode of operation.

A simple energy management, i.e., an energy management during operation, via a central control unit and a software tool, such as "PROFIenergy", is essentially known in automation installations. According to the underlying idea, the subsystems regularly transmit communication protocols, in the case of the "PROFIenergy" software tool in accordance with the "PROFINET" standard, to the central control unit, where present status parameters, such as the electrical energy requirement, are conveyed. The central control unit then regulates the energy flows to the subsystems based on these data and specifies the corresponding input voltages and input currents to the subsystems.

SUMMARY OF THE INVENTION

In view of the foregoing, it is an object of the invention to provide a method or device by which an improved energy management is implemented.

This and other objects and advantages are achieved by a device and method that is used for the proactive regulation of the energy flows in an electrical supply network of an automation installation with a number of connecting devices that are connected to the supply network so that an energy management is hereby implemented for the automation installation. In the method, the connecting devices exchange information with one another relating to their energy requirement or their energy supply. The exchange of energy via the electrical supply network then occurs based on this information. Automated industrial production plants in particular, and also automated logistics installations, such as a sorting and conveying installation for baggage at an airport, are considered as an automation installation within the sense of this application.

The regulation of the energy flows in the supply network is intended to occur not only in a reactive but also in a proactive manner. As a result, not only information relating to the present status of the connecting devices is exchanged, but also information relating to existing or planned operational status changes. The exchange of the information or data is effected for this purpose preferably using communication protocols, for example according to the "PROFINET" standard, and, in particular, through the use of already existing communication solutions, which are extended or modified for the benefit of the method. In the case of an electric motor as a connecting device, present rotational speed values, pending rotational speed changes, a present operating mode and a pending operating mode change, for example, are provided for the data exchange. The operating mode indicates whether the electric motor operates as an electric motor in the proper sense or whether it acts as a generator. In an automation installation for which the method set out here is designed, a plurality of electric motors of this type are connected as connecting devices to a common electrical supply network and the energy requirement of those electric motors that serve as electric consumers can be covered at least partially by the energy supply made available by those electric motors that serve as generators and accordingly as electrical producers.

The energy flows are thus regulated such that the energy requirement of the energy consumers is covered primarily by the energy supply of the energy producers. As a result, the energy redistribution within the automation installation is intended to be performed particularly effectively and an external energy supply is, as far as possible, to be dispensed with, where the use of intermediate energy stores is, as far as possible, preferably dispensed with. The input and output of electrical energy into intermediate stores or from intermediate stores for electrical energy is typically affected by losses. As a result, the overall energy requirement of the automation installation can be reduced due to the avoidance of precisely these.

Through the exchange of information between the connecting devices, it is ensured in particular that the electrical energy generated by electric motors that serve as generators is used as completely as possible to operate the automation installation. If the electric motors, for example, form part of an energy recovery system with which kinetic energy is converted into electrical energy, the conversion of the kinetic energy into electrical energy cannot be performed at any given time, since the kinetic energy is typically reduced through time due to friction losses. So that the energy recovery system therefore operates as effectively as possible, the kinetic energy must be converted into electrical energy as soon as the corresponding movement in the automation installation is no longer used. Although the electrical energy obtained via the energy recovery system can also be temporarily stored in a temporary store for electrical energy, the charging and discharging of a battery suitable for this purpose is typically also associated with losses, wherefore it is advantageous to feed electrical energy obtained using the energy recovery system directly to an electrical consumer, insofar as the operation of the latter is already provided.

A particularly vivid example is provided by a sorting and conveying installation for letter or parcel shipments, in which a plurality of conveyor belts are made up from conveyor segments. The conveyor segments are operated using electric motors and have light barriers with which objects that have arrived on the conveyor belt segment or have left the conveyor belt segment are registered. Instead of continuously driving a conveyor belt segment of this type, the segment is always started as soon as a letter or parcel consignment reaches the conveyor belt segment and interrupts one of the light barriers accordingly. The letter or parcel consignment is then transported via the conveyor belt segment over a specified path and triggers the second light barrier on leaving the conveyor belt segment at its end, as a result of which the energy recovery mode is activated and the kinetic energy of the conveyor belt segment is converted into electrical energy using the electric motor now acting as a generator. This recovered electrical energy is in turn used to start a different conveyor belt segment that is then intended to be used. Compared with a continuous operation of the conveyor belt segments, a large proportion of electrical energy can be saved for operation with this concept.

As previously mentioned, the regulation of the energy flows in the supply network is performed not only reactively but also proactively in accordance with the disclosed method and therefore the connecting devices also exchange information with one another relating to the expected variation with time in their energy requirement or energy supply and an exchange of energy occurs based on this information. On the one hand, sensors are provided as a source for this information, where a calculation of the further variation with time is performed based on the sensor data and, on the other hand, control signals that control the process implemented with the corresponding automation installation are intended to be evaluated. In the case of an industrial production plant, boundary conditions that define at least roughly the production process and therefore the operating mode of the production installation are typically specified in connection with the production scheduling. For example, the production quantity per time unit to be achieved with the production plant is specified via a production scheduling of this type. The individual functional modules of the production plant, which normally operate in coordination with one another, are then controlled via a central control unit for the production scheduling so that the specified production quantity is achieved in the corresponding period.

For further explanation, a simple example will be assumed, where two workstations are provided that are interconnected by a conveyor belt. On the first workstation, two components are combined to form an intermediate product that is then forwarded via the conveyor belt to the second workstation. In the second workstation, the intermediate product is painted, thereby creating the finished final product. If the production rate is then to be increased, the first workstation first receives a control signal with which the operating speed of this workstation is increased. A control signal is then sent to the conveyor belt so that the conveying speed is increased, and finally a control signal is also sent with a certain time delay to the second workstation, in order to increase the operating speed on this workstation also. Alternatively to a deferred transmission of the control signals, control signals that trigger an operational status change in a deferred manner, but which are transmitted simultaneously by the central control unit, can also be generated.

It is already evident from this simple example that an entire range of operational status changes of individual connecting devices occurs with a certain advance warning time, so that the resulting variation with time in the energy requirement of the connecting device concerned can be incorporated into the proactive regulation of the energy flows in the electrical supply network. The operational status changes and the advance warning time in the system, i.e., the automation installation, which are known depend on whether a planned operational status change or an unforeseen operational status change is involved.

A temporary rundown or shutdown of parts of the production plant or the entire production plant is designated as a planned operational status change. Also, since an automated industrial production plant cannot typically be operated without personnel, it is appropriate to run down into a standby mode or even shut down parts of the plant or the entire plant during the provided breaks for the personnel. Changes of this type in the production process are known to the system with very long advance warning times, so that the associated operational status changes of the connecting equipment can be fully taken into account in the energy management.

Conversely, unforeseen operational status changes, which are normally caused by errors or defects in the production installation, require very short advance warning times, so that it is only possible to respond here occasionally to operational status changes. However, in the case of a production chain, the operational status changes of connecting devices that are part of this production chain occur with a time delay according to the sequence in the production chain, so that at least some of the operational status changes are known here with sufficient advance warning time and can be taken into account accordingly in the energy management.

Furthermore, an alternative method is appropriate in which data protocols without specification of an addressee are essentially used for the exchange of information. The information is conveyed accordingly as "broadcast" messages, as a result of which each connecting device has access to information of all other connecting devices. This type of communication is suitable in particular if the actual addressee is not initially known. In the present case, a balancing between the energy supply and the energy requirement of the connecting devices is to occur, where each connecting device initially has no information on the other connecting devices, the energy requirement they have or the energy supply they offer. Accordingly, a connecting device indicates to virtually all other connecting devices the energy requirement it has or the energy supply it offers and how this status will change in the near future. If all connecting devices have made their status known, the entire energy requirement and the entire energy supply of all connecting devices of the automation installation are known, whereupon a regulation of the energy flow occurs for the purpose of performing a balance between the energy supply and energy requirement in the electrical supply network.

In an advantageous further embodiment, the connecting devices finally form a self-organizing device network, as a result of which a central control unit to regulate the energy flows in the electrical supply network can be dispensed with.

Accordingly, each connecting device that presently serves as an electrical producer and generates electrical energy accordingly provides electrical energy independently to every remaining connecting device that registers in the system as a present electrical consumer. A central control unit that evaluates the information of the connecting devices and controls the energy distribution is not provided.

Particularly in the case of large automation installations with correspondingly many connecting devices, an alternative method is advantageous in which the self-organizing device network is subdivided into subnetworks, where the connecting devices of a subnetwork initially exchange information and energy with one another, and where an energy requirement or an energy supply that cannot be compensated within a subnetwork is finally compensated as far as possible by an information and energy exchange between the subnetworks. If, for example, an automation installation is constructed from a plurality of sub-installations, where each sub-installation is housed in its own production hall, the connecting devices within a production hall are initially intended to exchange information and energy with one another, and an energy exchange between the individual production halls is intended to occur only if the energy requirement cannot be covered by the energy supply within a production hall or the energy supply cannot be used completely due to the energy requirement.

In this way, inter alia, the loss-affected energy transport of electrical energy via cable connections can be reduced to a small amount, since the energy exchange preferably takes place locally over short connection paths.

It is furthermore appropriate if the supply network is connected to an external supply network or distribution network which balances the time-dependent difference between a specified energy requirement and a specified energy supply of all connected connecting devices. Particularly in production plants, the energy requirement specified by the production scheduling cannot be covered without additional external energy sources. Even if internal energy sources, such as solar installations or wind power installations, are used in modern production plants and energy recovery systems are additionally used, a part of the energy requirement must nevertheless be covered via a power supply company connection, i.e., a connection of the supply network of the production plant to a distribution network of a power supply company. A power supply company connection of this type does not act here as a connecting device and accordingly is also not part of the self-organizing network. Consequently, no information exchange occurs between the power supply company connection and the connecting devices. Instead, the power supply company connection is regarded by the self-organizing network as an inexhaustible energy source, the energy requirement or energy supply of which always corresponds to the energy supply or the energy requirement of the entire automation installation.

An alternative method is also advantageous in which the energy flows are regulated in the energy management such that the time-dependent difference between a time-dependently specified energy requirement and a time-dependently specified energy supply of all connecting devices, i.e., the energy requirement to be covered via the power supply company connection, is essentially constant. Here, the aim is, in particular, to maintain the load that the automation installation represents from the perspective of the distribution network of the power supply company and that is active on the power supply company connection as constant as possible. An automation installation and, in particular, a production plant typically have a relatively high energy requirement and fluctuations in the energy requirement are in principle possible which, for example, in the event of the shutdown of the automation installation overnight, are of the same order of magnitude as the average energy requirement of the automation installation. As a result, fluctuations in the energy requirement of the automation installation clearly impact on the stability in the distribution network of the power supply company, as a result of which the security of supply of other systems connected to the distribution network is in turn jeopardized. For this reason, the operators of the production plant must convey the expected energy requirement and the anticipated time-dependent variation in the energy requirement to the power supply company, so that the power supply company can adjust to this, such as by adjusting the power of the power stations feeding the distribution network according to the variation with time in the expected energy requirement. If the actual energy requirement differs in a specific period from the previously notified energy requirement, this causes fluctuations in the distribution network which can only be compensated at substantial technical expense. For this compensation, the power supply company charges the operator of the automation installation additional costs that are very much higher than the costs for the electrical energy that is used to cover the previously notified energy requirement. In order to avoid such additional costs, the energy management is designed such that the present energy requirement of the production plant corresponds as precisely as possible to the previously notified energy requirement of the automation installation. In addition, the avoidance of significant fluctuations in the distribution network, on the one hand, and in the supply network, on the other hand, also contributes to the operational reliability of the automation installation itself.

In accordance with a further very appropriate alternative method, the energy flows are regulated such that the time-dependent difference between a time-dependently specified energy requirement and a time-dependently specified energy supply of all connecting devices is minimized on average over time. This means that the energy requirement of the automation installation and, in particular, the energy requirement that is covered via the power supply company connection is maintained as low as possible. Here, it is appropriate, inter alia, to make effective use of the energy recovery system employed.

An alternative method is additionally advantageous in which the connection devices act as energy consumers, energy producers or energy stores, and in which the energy flows are regulated such that the energy requirement of the energy consumers is covered primarily by the energy supply of the energy producers. As a result, the energy redistribution within the automation installation is intended to be performed particularly effectively, where the use of intermediate energy stores is, as far as possible, preferably dispensed with. The input and output of electrical energy into intermediate stores or from intermediate stores for electrical energy is typically affected by losses. Consequently, the energy requirement of the automation installation can be reduced overall due to the avoidance of precisely these losses.

According to a further very appropriate alternative method, the energy flows are regulated such that the time-dependent difference between a time-dependently specified energy requirement and a time-dependently specified energy supply of all connecting devices is minimized on average over time. This means that the energy requirement of the automation installation and, in particular, the energy requirement that is covered via the power supply company connection is maintained as low as possible. Here, it is appropriate, inter alia, to make effective use of the energy recovery system employed.

It is furthermore appropriate if at least one connecting device acts as an energy consumer, energy producer or energy store, depending on its operational status. Specifically with the use of energy recovery systems, it is appropriate to use the same electric motor for the conversion of electrical energy into kinetic energy and for the conversion of kinetic energy into electrical energy, which is typically referred to as energy recovery. The motor then acts either as an electric motor in the proper sense or, however, as a generator. Depending on its operational status, a connecting device of this type acts accordingly either as an energy consumer, i.e., as an electric motor, or as an energy producer, i.e., as a generator.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in detail below with reference to a schematic drawing, in which.

DETAILED DESCRIPTION OF THE EXEMPLARY EMBODIMENTS

Parts corresponding to one another are provided with the same reference numbers in all figures.

In the example embodiment described below, the method described here is used by way of example in an automation installation shown in FIG. 1 which is provided by an industrial production plant 2 with an electrical supply network 4 to which five connecting devices are connected.

As an example of a connecting device acting as an energy consumer, a workstation 6 is shown that has a specific energy requirement depending on its operational status. That operational status of the workstation 6 is typically specified here by the production scheduling, by which, for example, parameters such as the product quantity to be manufactured per time unit are defined. Furthermore, for example, the times at which the production plant 2 is used for the product manufacture and the times at which the production plant or parts of the production plant are switched to a standby mode or are shut down are defined within a production scheduling. Since personnel are required for the operation of an automated production plant, production breaks must be also scheduled even in the case of a 24-hour shift operation, during which the personnel can take a break. Since large-scale production plants 2 frequently have to be switched to the production-ready status via a complex and time-consuming start-up procedure, it is customary for a production plant not to be shut down for shorter production interruptions, but to be switched to a standby mode. This standby mode is an operating mode in which the energy requirement corresponds to a fraction of the energy requirement during production and it is simultaneously permitted to switch the production plant back to the production-ready status via a simplified and less time-consuming reactivation procedure. Accordingly, a shutdown of the production plant typically takes place only in the event of a production interruption lasting several hours, i.e., for example, for the company holiday period.

Such operational status changes of the connecting devices initiated by the production scheduling are known to the system, i.e., the production plant 2, with sufficient advance warning time, so that these operational status changes allow a proactive regulation of the energy flows in the electrical supply network 4. In addition, however, unscheduled operational status changes are also possible, which occur, for example, when a problem or defect arises somewhere in the production plant 2. In the case of unscheduled operational status changes of this type, the advance warning times are occasionally very short, so that only a reactive regulation of the energy flows is then possible. However, not all connecting devices are normally affected thereby, because a plurality of connecting devices often form a production chain and accordingly perform different sub-steps in the production process in a given sequence. If a problem or defect therefore occurs on a connecting device, an operational status change tends to occur in this connecting device without sufficient advance warning time. However, the corresponding operational status change occurs with a time delay for the connecting devices downstream in the production chain in accordance with to the sequence in the production chain, as a result of which a sufficient warning time is given in the case of these connecting devices.

If, for example, the first workstation of the production chain therefore shuts down automatically due to a defect, this shutdown occurs abruptly and the resulting lower energy requirement of the production plant 2 occurs without a sufficient advance warning to the system. In the workstations themselves downstream in the production chain, no defect occurs, so that no automatic shutdown occurs here initially. However, since the first workstation has suspended its operation, the supply of the downstream workstations with products is missing, wherefore the workstations similarly suspend their operation with a certain time delay. As soon as the abrupt shutdown of the workstation 1 is registered in the production plant 2, it is also known that operational status changes, here shutdowns, of the workstations downstream in the production chain will follow at a specified time interval. At least the operational status changes of the downstream workstations can be taken into account accordingly in the proactive regulation of the energy flows in the electrical supply network 4.

Figure 1:
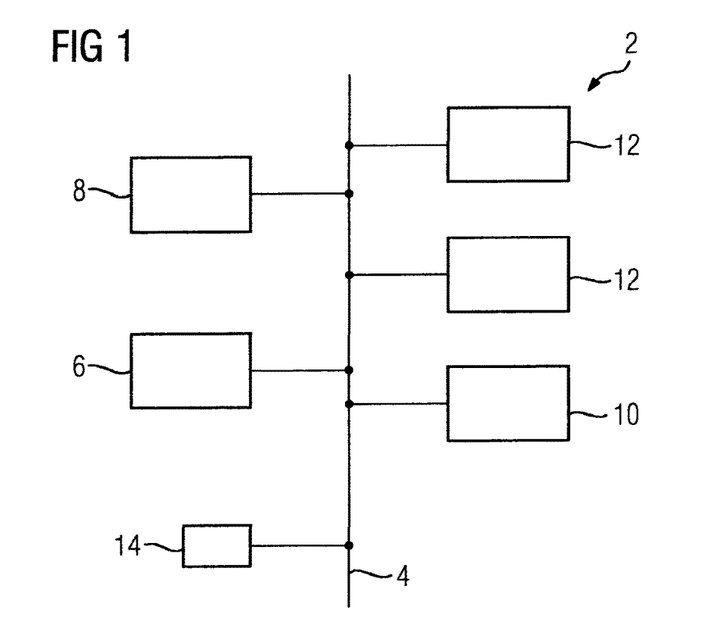
FIG. 1 shows an automated in accordance with the invention production plant in a partial block diagram representation.

A diesel generator 8 is shown in FIG. 1 as a further example of a connecting device. This generator feeds electrical energy into the supply network 4 depending on its operational status and therefore provides an energy supply to the production plant 2. In the case of the diesel generator 8, the energy supply can be specified by controlling the diesel generator 8, for example, within the production scheduling. Conversely, for example, if a solar installation or a wind power installation is provided as a connecting device, the energy supply is dependent on the prevailing weather conditions.

In this case, the present energy supply is recorded by sensors, whereas the variation with time in the energy supply tends to be unknown.

FIG. 1 also shows, as a connecting device, an electric motor 10 which is part of an energy recovery system and operates accordingly, similar to an electrically operated motor vehicle, depending on its operational status, either as an electric motor 10 in the proper sense or, however, as a generator 10.

The electric motor 10 thus acts as an energy consumer or as an energy producer, depending on its operational status.

In addition, two batteries 12 are connected to the electrical supply network 4 as connecting devices that temporarily store electrical energy and function as energy consumers during a charging procedure or as energy producers during a discharging procedure.

The connecting devices jointly form a self-organizing network in which the individual connecting devices communicate with one another via broadcast messages to the entire network. These broadcast messages are preferably based on the "PROFINET" standard and contain information on the present energy requirement and the variation with time in the energy requirement or the present energy supply and the variation with time in the energy supply of the corresponding connecting device. Within the self-organizing network, a reactive and preferably additionally proactive regulation of the energy flows in the electrical supply network 4 is then initialized such that the energy requirement of the connecting devices serving as energy consumers is covered by the energy supply of the connecting devices serving as energy producers. An attempt is made here in the first instance to dispense with the involvement of temporary energy stores, such as the batteries 12. A balancing via the temporary stores is undertaken only if the energy supply and energy requirement do not match one another.

In this way, unnecessary charging and discharging procedures on the temporary stores, which are normally associated with electrical energy losses, are intended to be avoided.

Although solar installations or wind power installations are also frequently incorporated into modern production plants 2 and energy recovery systems are additionally increasingly used, production plants 2 are typically reliant on an external energy source to achieve an equalization of the energy balance of the production plant 2. To do this, the electrical supply network 4 of the production plant 2 is connected in the exemplary embodiment via a power supply company connection 14 to the electrical distribution network of an energy supply company. That power supply company connection 14 does not act here as a connecting device and accordingly is not communicatively incorporated into the self-organizing network of the connecting devices. The power supply company connection 14 represents an inexhaustible source or an inexhaustible sink for the network, via which the time-dependent energy balance of the production plant 2 is continuously equalized.

Along with the equalization of the energy balance, two further objectives are pursued in the proactive regulation of the energy flows in the electrical supply network 4. On the one hand, in the case of a production specified via the production scheduling, the electrical energy that is obtained via the power supply company connection 14 is maintained as low as possible to maintain the energy costs for the operator of the production plant 2 correspondingly low. On the other hand, it is appropriate to maintain the time-dependent load which the production plants 2 represents from the perspective of the distribution network of the power supply company as constant as possible.

Figure 2:
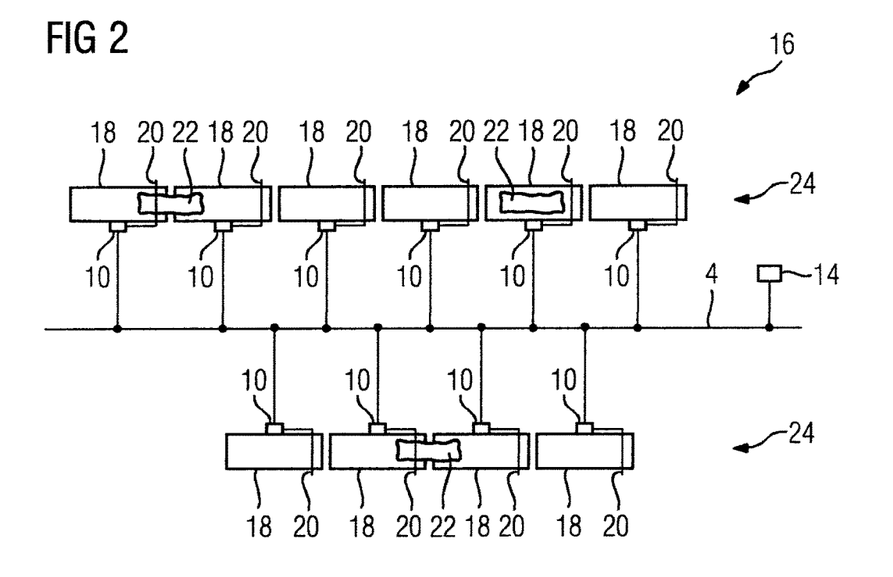
FIG. 2 shows an automated sorting and conveying installation in a partial block diagram representation in accordance with the invention.

Alternatively, a self-organizing network of this type can also be used advantageously, for example, in an automatic baggage-conveying installation 16, of the type used, for example, at airports, and as shown schematically in FIG. 2. Here, short conveyor belt segments 18, for example only a few meters in length, together form a sorting and conveying installation with a total conveyer path of several kilometers, for example 30-50 km. Each of these conveyor belt segments 18 has a light barrier 20 on one end and is driven via an electric motor 10 which furthermore, as a generator 10, converts kinetic energy no longer required partially back into electrical energy.

If a baggage item 22 then moves towards a conveyor belt segment 18, the light barrier 20 disposed on the end of the conveyor belt segment 18 is interrupted and the corresponding conveyor belt segment 18 is started up by the electric motor 10. The baggage item 22 is then further transported via the conveyor belt segment 18 until it interrupts the light barrier 20 of a conveyor belt segment 18 positioned downstream, whereupon the energy recovery begins via the electric motor 10 of the conveyor belt segment 18 concerned, operating as a generator 10. The electrical energy recovered in this way is forwarded via a common electrical supply network 4 to a further conveyor belt segment 18, which has registered an energy requirement in the self-organizing network which is formed by the conveyor belt segments 18.

Not only the conveyor belt segments 18 of a conveyer path 24, but also the conveyor belt segments 18 of the typically provided redundant conveyer paths 24, are incorporated here into this self-organizing network. Due to the large number of conveyor belt segments 18 of a sorting and conveying installation of this type, substantial technical expense would be incurred in regulating the energy flows in the common supply network 4 using a central control unit. Precisely this central control unit is dispensed with in the use of the self-organizing network.

The invention is not restricted to the example embodiment described above. Indeed, other alternatives of the invention can also be derived by the person skilled in the art herefrom without departing from the subject-matter of the invention. In particular, all individual features described in connection with the example embodiment can furthermore be combined with one another in a different way without departing from the subject-matter of the invention.

Figure 3:
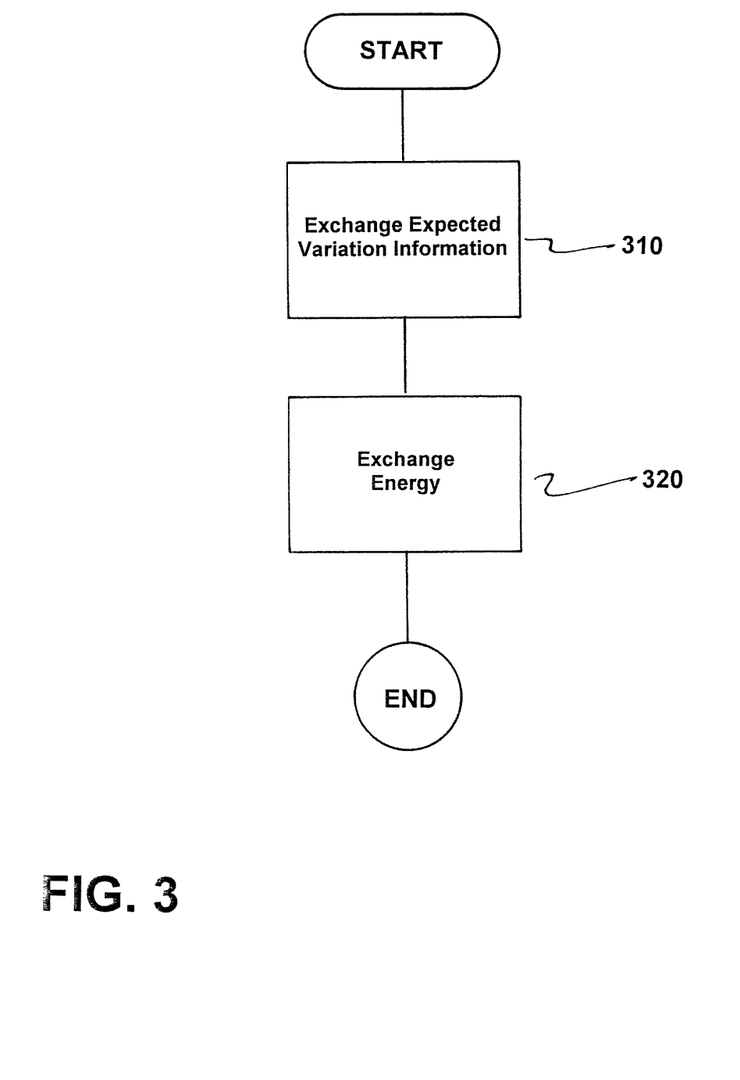
FIG. 3 is a flowchart of the method in accordance with the invention.

FIG. 3 is a flowchart of a method for the proactive regulation of energy flows in an electrical supply network of an automation installation having a plurality of connecting devices that are each connected to the supply network, where a plurality of the connecting devices have an electric motor serving as a generator or as an electric drive, and depending on an operating mode of electric motor, the plurality of connecting devices exchange information with respect to their energy requirement or their energy supply with one another. The method comprises exchanging, among the plurality of connecting devices, information on an expected variation over time of an energy requirement or energy supply of the plurality of connecting devices, as indicated in step 310.

Energy is then exchanged among the plurality of connecting devices based on the expected variation over time of the energy requirement or energy supply information, as indicated in step 320. In accordance with the method of the invention, information is formed as broadcast messages, each of the plurality of connecting devices serves as either (i) an energy consumer, (ii) an energy producer or (iii) an energy store, energy flows are regulated such that an energy requirement of energy consumers is covered primarily by an energy supply of energy producers, and the energy supply of the energy producer is fed directly to the energy consumer.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for proactively regulating energy flows in an electrical supply network of an automated industrial production plant comprising a conveying installation including workstations interconnected by conveyor belts and having a plurality of connecting devices which are each connected to the supply network, and a plurality of the connecting devices of the conveying installation having an electric motor serving as a generator or as an electric drive, wherein depending on an operating mode of the electric motor, the plurality of connecting devices of the conveying installation exchange information with respect to their energy requirement or their energy supply with one another, the method comprising:
exchanging, among the plurality of connecting devices of the automated industrial production plant comprising the conveying installation including the workstations, information on an expected variation over time of an energy requirement or energy supply of the plurality of connecting devices of the conveying installation; and
exchanging, among the plurality of connecting devices of the automated industrial production plant comprising the conveying installation including the workstations, energy based on the expected variation over time of the energy requirement or energy supply information;
wherein the information is formed as broadcast messages in accordance with the PROFINET standard;
wherein each of the plurality of connecting devices of the automated industrial production plant comprising the conveying installation including the workstations serves as one of (i) an energy consumer, (ii) an energy producer and (iii) an energy store;
wherein energy flows are regulated such that an energy requirement of energy consumers is covered primarily by an energy supply of energy producers;
wherein the energy supply of the energy producer is fed directly to the energy consumer without being temporarily stored; and
wherein the plurality of connecting devices of the automated industrial production plant comprising the conveying installation including the workstations form a self-organizing device network which functions without a central coordinating energy control unit.

2. The method as claimed in claim 1, wherein data protocols without specification of an addressee are used for the information exchange.

3. The method as claimed in claim 1, wherein the self-organizing device network is subdivided into subnetworks; wherein the plurality of connecting devices of a subnetwork exchange information and energy with one another; and wherein the subnetworks exchange information and energy with one another.

4. The method as claimed in claim 1, wherein the electrical supply network is connected to an external supply network which balances a time-dependent difference between a specified energy requirement and a specified energy supply of all connecting devices of the plurality of connecting devices of the automated industrial production plant comprising the conveying installation including the workstations.

5. The method as claimed in claim 4, wherein the energy flows are regulated such that the time-dependent difference between a time-dependently specified energy requirement and a time-dependently specified energy supply of all connecting devices of the plurality of connecting devices of the automated industrial production plant comprising the conveying installation including the workstations is constant.

6. The method as claimed in claim 4, wherein the energy flows are regulated such that the time-dependent difference between a time-dependently specified energy requirement and a time-dependently specified energy supply of all connecting devices of the plurality of connecting devices of the conveying installation including the automated industrial production plant comprising the workstations is minimized on average over time.

7. The method as claimed in claim 5, wherein the energy flows are regulated such that the time-dependent difference between a time-dependently specified energy requirement and a time-dependently specified energy supply of all connecting devices of the plurality of connecting devices of the automated industrial production plant comprising the conveying installation including the workstations is minimized on average over time.

8. The method as claimed in claim 1, wherein at least one connecting device of the plurality of connecting devices of the automated industrial production plant comprising the conveying installation including the workstations serves as one of (i) an energy consumer, (ii) an energy producer or (iii) an energy store, depending on an operational status of the connecting device.

9. An energy regulation system of an automated industrial production plant comprising a conveying installation including workstations interconnected by conveyor belts, an electrical supply network, and a plurality of connecting devices within the automated industrial production plant comprising the conveying installation including the workstations which are each connected to the supply network, wherein a plurality of the connecting devices of the automated industrial production plant comprising the conveying installation including the workstations include an electric motor which serves as a generator or an electric drive, depending on an operating mode of the electric motor, the plurality of connecting devices of the automated industrial production plant comprising the conveying installation including the workstations exchange information with respect to their energy requirement or their energy supply with one another, wherein the energy regulation system is configured to proactively regulate energy flows in the electrical supply network of the conveying installation having the plurality of connecting devices which are each connected to the supply network, wherein the information is formed as broadcast messages in accordance with the PROFINET standard;

wherein each of the plurality of connecting devices of the automated industrial production plant comprising the conveying installation including the workstations serves as one of (i) an energy consumer, (ii) an energy producer and (iii) an energy store;

wherein energy flows are regulated such that an energy requirement of energy consumers is covered primarily by an energy supply of energy producers;

wherein the energy supply of the energy producer is fed directly to the energy consumer without being temporarily stored; and     wherein the plurality of connecting devices of the automated industrial production plant comprising the conveying installation including the workstations form a self-organizing device network which functions without a central coordinating energy control unit.

10. An automated industrial production plant comprising a conveying installation including workstations interconnected by conveyor belts, an electrical supply network, and a plurality of connecting devices which are each connected to the supply network, a plurality of the connecting devices of the automated industrial production plant comprising the conveying installation including the workstations include an electric motor which serves as a generator or as an electric drive, depending on an operating mode of the electric motor, and the plurality of connecting devices of the automated industrial production plant comprising the conveying installation including the workstations exchange information with respect to their energy requirement or their energy supply with one another, and an energy regulation system having the electrical supply network and the plurality of connecting devices of the conveying installation which are each connected to the supply network, the energy regulation system being configured for proactive regulation of energy flows in the electrical supply network of the conveying installation having the plurality of connecting devices of the conveying installation which are each connected to the supply network; wherein the information is formed as broadcast messages in accordance with the PROFINET standard;

wherein each of the plurality of connecting devices of the automated industrial production plant comprising the conveying installation including the workstations serves as one of (i) an energy consumer, (ii) an energy producer and (iii) an energy store;

wherein energy flows are regulated such that an energy requirement of energy consumers is covered primarily by an energy supply of energy producers;

wherein the energy supply of the energy producer is fed directly to the energy consumer without being temporarily stored; and     wherein the plurality of connecting devices of the automated industrial production plant comprising the conveying installation including the workstations form a self-organizing device network which functions without a central coordinating energy control unit.

11. The automated industrial production plant as claimed in claim 10, further comprising:

a logistics installation constructed from conveyor belt segments;

wherein the conveyor belt segments are connected as connecting devices to the supply network; and     wherein the conveyor belt segments serve as energy consumers or as energy producers, depending on an operational status of the conveyor belt segments.

12. The automated industrial production plant as claimed in claim 11, wherein the conveyor belt segments include light barriers and are configured such that a conveyor belt segment is started up only when an object reaches a corresponding conveyor belt segment; and     wherein the corresponding conveyor belt segment is switched to an energy recovery mode as soon as the object again leaves the corresponding conveyor belt segment.

\* \* \* \* \*